Patented Aug. 19, 1947

2,426,118

UNITED STATES PATENT OFFICE 2,426,118

PROCESS FOR THE CATALYTIC DEHYDROGENATION OF HYDROCARBONS

Robert L. Parker, Jr., Los Angeles, and Hal C. Huffman, Long Beach, Calif., assignors to Union Oil Company of California, Los Angeles, Calif., a corporation of California No Drawing. Application December 21, 1943, Serial No. 515,122

11 Claims. (Cl. 260—680)

This invention relates to the catalytic conversion of hydrocarbons and particularly to the dehydrogenation of normally gaseous hydrocarbons in the presence of a novel catalyst.

It is known that when hydrocarbons are subjected to elevated temperatures in the presence of catalysts, they may be "converted" or changed in form. Well known conversion processes for example include cracking, reforming, and the like, as well as dehydrogenation and the like. The type of conversion which occurs depends not only on the reaction conditions, but on the type of catalyst employed. Some catalysts appear to affect predominantly the carbon to carbon bonds of the hydrocarbon, while others affect predominantly the carbon to hydrogen bonds. It is clear that a catalyst of the former type should preferentially promote cracking reactions, while a catalyst of the latter type should preferentially promote dehydrogenation reactions, and this has been observed to be true in a general way. Silica, for example, appears to affect carbon to carbon bonds to a much greater extent than does alumina, and consequently in making dehydrogenation catalysts, although alumina is frequently employed in substantial proportions as a carrier, silica is generally avoided.

It has now been discovered that the presence of a small proportion of silica in dehydrogenation catalysts, contrary to the indications of the prior art, is highly desirable, particularly with regard to increasing the stability of the catalyst toward heat, and preserving its activity over a longer useful life. This desirable effect of silica is particularly evident in the case of dehydrogenation of normally gaseous hydrocarbons, in which process the optimum proportion of silica in the catalyst is about 1% by weight.

It is an object of this invention therefore, to provide an efficient dehydrogenation process, whereby acyclic hydrocarbons having 2 to 5 carbon atoms may be catalytically treated to increase their degree of unsaturation; for example, butanes may be converted to butenes and butadiene, butenes may be converted to butadiene, propane may be converted to propene, and pentanes may be converted to pentenes, isoprene, etc. It is a further object to provide a novel and exceptionally useful catalyst for this process. Other objects will become apparent.

We have discovered that by incorporating a small amount of silica such as about 1%, in a catalyst consisting predominantly of an alumina gel carrier impregnated with minor proportions of chromia and beryllia, the dehydrogenating activity of the catalyst is enhanced, its heat stability is increased, and its effective life is lengthened. The resulting catalyst is particularly effective for the dehydrogenation of butanes to butenes and butenes to butadiene. This type of dehydrogenation is of great importance at the present time because of the extensive use of butenes in alkylation processes for the production of aviation gasoline, and the use of both butenes and butadiene in the preparation of synthetic rubber and plastics.

As a specific example of our invention, a carrier consisting of an alumina gel containing 0.9% silica was prepared by precipitation of the hydrous oxides from aqueous solutions of soluble salts of aluminum and silicon, and this carrier was ignited in air at about 500° C. for about 2 hours to convert it into a hard highly adsorptive gel. This product, screened to 8 to 20 mesh size, was then impregnated with solutions of beryllium and chromium salts as follows: to 900 grams of the ignited carrier was added 379 grams of beryllium nitrate $Be(NO_3)_2 \cdot 3H_2O$ dissolved in 800 ml. of distilled water. The mixture was heated to dryness with constant agitation, and the resulting material was dried for 16 hours at about 250° C. followed by a 2 hour ignition at 500° C. To this beryllia-impregnated product was added a solution of 84 grams of ammonium dichromate $(NH_4)_2Cr_2O_7$ dissolved in 800 ml. of distilled water, and this mixture was heated to dryness with agitation, dried and ignited as above, to obtain a finished catalyst containing about 5% by weight of beryllia, 5% of chromia, 0.8% of silica, and the remainder alumina.

The above catalyst was employed to dehydrogenate butane in the following operation: gaseous n-butane was preheated and passed at a rate of 5 liters per hours through 5 ml. of the above catalyst in a reaction chamber at a temperature of about 565° C. (1050° F.), and substantially atmospheric pressure. This feed rate corresponds to a space velocity (volumes of feed gas, measured at 0° C. and 760 mm. pressure, per volume of catalyst per hour) of 912. Under these conditions, the average conversion of butane to butenes over a 2-hour reaction cycle was 34.4% (mol per cent) which is not far from the maximum theoretically possible (equilibrium) conversion at this temperature. The catalyst was then regenerated by substituting a smaller flow of air for the n-butane flow for a period of about 6 hours at about the same temperature. Butane was then substituted for the air flow for another 2-hour cycle similar to the first cycle, and substantially the same conversion was obtained.

The heat stability, life, strength, and other characteristics of the above catalyst are all remarkably good, as brought out in the following paragraphs.

A heat stability test for catalysts has been developed which will be referred to as the 850° C. calcination test. In this test a sample of catalyst is subjected to a temperature of 850° C. in air for a period of 6 hours. At the end of this time its physical characteristics and catalytic activity are again determined, and any changes brought about by the calcination are noted. Usually, it is found that catalysts supported on alumina lose their hardness, become soft and powdery, and lose most of their catalytic activity. This is true to a limited extent even of the above catalyst when the silica is omitted from its composition. With the silica incorporated however, the above catalyst upon calcination at 850° C. retained substantially entirely its original form and mechanical strength, and gave a 24% conversion of butanes to butenes when tested as above. The 850° C. calcination test has been found to be a fairly reliable index of the behavior of dehydrogenation catalysts over extended periods of usage; i. e., a good retention of strength and activity upon calcination at 850° C. generally indicates that the catalyst will also have a good retention of strength and activity in use over an extended period of time. The results of the above test indicate that this catalyst will preserve its strength and excellent activity through many hundreds of cycles of use and regeneration as described above.

The explanation for the remarkable effect of the silica on the catalyst as described above is not known. It is only known that the silica-promoted catalysts of the type described above have tremendous surface area, larger than that of any other dehydrogenation catalysts of similar type; and it also appears that the presence of the silica with the alumina prevents or at least retards the conversion of the alumina to an inactive form.

The above catalyst is also very effective for the production of butadiene, either from butanes or butenes. For this dehydrogenation operation slightly higher temperatures are preferable, in the neighborhood of 600° C., and the effective pressure should be lower, in the neighborhood of 100 to 500 mm. of mercury. These low effective pressures may be attained either by operating under vacuum at these total pressures, or by employing total pressures as high as 2 or even 5 atmospheres, and having a diluent or inert gas such as nitrogen, methane and the like, present in such proportions as to lower the effective pressure (i. e., the partial pressure of the hydrocarbons being converted) to a value within the desired range. When butane is being dehydrogenated to butadiene, longer contact times, i. e., lower space velocities, such as about 300 or less may be used, while in the dehyrodrogenation of butenes, higher space velocities, such as 3000 or more may be used. In general the most suitable temperatures for butane and butene dehydrogenation are between about 550° C. and 650° C., with higher space velocities being employed at the higher temperatures.

Other "normally gaseous" acyclic hydrocarbons having 2 to 5 carbon atoms may also be dehydrogenated preferably under the conditions given above, although somewhat higher temperatures are desirable for the dehydrogenation of ethane and propane, while somewhat lower temperatures are desirable for the dehydrogenation of the pentanes.

For the above dehydrogenation process, the preferred catalysts are of the type indicated above, i. e., they should consist of a gel type alumina carrier containing about 1% of silica, impregnated with solutions of chromium and beryllium and ignited so as to obtain a finished catalysts containing about 1% to 15% of chromia and about 1% to 15% of beryllia, by weight. For the purposes of this invention, beryllia concentrations of 1% to 5% are preferred. Although silica concentrations of about 1% are preferred, the silica has a pronounced beneficial effect even when present in 0.5% or lower concentrations, and up to about 5%, and even in some instances as high as 15%.

The beneficial effects of small amounts of silica are not entirely limited to the above catalysts nor to the above dehydrogenation process, however. It has been found, for example, that catalysts of the above type are excellent for all sorts of hydrocarbon conversion processes such as cracking of gas oils and the like; isomerization of paraffins, olefins, and naphthenes; reforming, aromatizaton and hydroforming of gasolines and naphthas; and like processes which are carried out at temperatures between about 400° C. and 900° C. in the presence or absence of hydrogen. In hydroforming operations for example, which are preferably carried out on liquid hydrocarbons such a petroleum naphthas, at temperatures between about 400° C. and 600° C. and pressures of 10 or more atmospheres, in the presence of about 2000 to 10,000 cubic feet of hydrogen per barrel of feed, the above catalysts are excellent, especially when the silica content is about 5%, or lies between about 1% and 10%. For catalytic cracking of gas oils, which is generally carried out at temperatures between 450° C. and 550° C., similar catalysts containing up to about 15% silica are preferred.

The alumina in the above catalysts is preferably the gel type, and may be prepared by precipitation with ammonia of an aluminum chloride, nitrate, or sulfate solution, with thorough washing of the precipitate to remove soluble salts, or by any other suitable method for obtaining a gelatinous alumina carrier. The silica is preferably coprecipitated with the alumina from a silicon tetrachloride solution or other solution, but may be separately precipitated and adsorbed on the hydrous gelatinous alumina. The carrier of alumina-silica is dried and ignited at about 500° C. to 600° C. to "activate" it and increase its adsorptive power. It may be ground and pelleted, or extruded, or merely broken into granules of suitable size, either before or after igniting. Commercial "activated alumina" may also be used, especially if it is the gel type. Crystalline, corundum, or alpha alumina, however, is not effective in our catalysts.

In incorporating the chromium and beryllium into the above carriers, the impregnation procedure as described above or merely dipping the ignited carrier in the solution of the chromium or beryllium salt are preferred methods, but the chromium or beryllium hydroxides may also be coprecipitated with the alumina and silica, as by addition of ammonia to the solutions of the nitrates or chlorides. If coprecipitated, the product is dried, pelleted, etc. as described for the carrier.

It has been found that catalysts in which the other metals of group VI B such as tungsten, uranium, and particularly molybdenum, are substituted for part or all of the chromium in the above catalysts, are also beneficially effected by the presence of small amounts of silica. These metals are members of the first, second, third, and fourth groups respectively, of the "transitional elements" as defined below. In fact the presence of about 0.5 to 15%, preferably about 1% to 5% of silica incorporated as above, improves any catalyst consisting of an "active alumina" (this term does not include the crystalline, corundum, or alpha aluminas mentioned above but does include gel and granular activated aluminas) in combination with an oxide or sulfide of a "metal of the transition series," which term includes metals of group VI B as described above and metals of the groups having atomic numbers between 21 and 30 or between 39 and 48. These latter groups constitute the first and second groups of the so-called "transitional elements," in the structure of which the differentiating electron is in the second from the outermost shell. This classification is the one set out by Luder in "An improved periodic table," Journal of Chemical Education, vol. 16, pages 393 and 394 (August 1939), as an elaboration of earlier periodic tables formulated by Ebel and by Bohr. The first transitional group includes scandium, titanium, vanadium, chromium, manganese, iron, cobalt, nickel, copper and zinc, and the second transitional group includes yttrium, zirconium, columbium, molybdenum, masurium, rubidium, rhodium, palladium, silver and cadmium. Of these active metals those of the first transitional group are preferred. The oxides or sulfides of these active metals may be mixed, i. e. deposited on the silica-alumina in the form of mixtures of oxides or sulfides or of compounds including 2 or more metals, such as cobalt molybdate, cobalt thiomolybdate, copper vanadate, nickel chromite, and the like. It is preferable that such catalysts contain a minor proportion of beryllia also, such as about 1% to 15% as indicated above. The beryllia does not appear to have a catalytic effect by itself, such as is the case with the above "active" metal oxides, but it appears to promote and increase the catalytic effect of the active metal oxides. This effect may or may not be analogous to the effect of the silica on the active alumina.

It has also been found that the desirable effects of silica on the above catalysts for hydrocarbon conversion, are also imparted by zirconia, and even by titania, although the silica is preferred. Silicon, titanium, and zirconium are all elements of group IV of the periodic system. The zirconia and titania may be employed in about the same amounts as the silica, i. e. about 0.5% to 15%, and are also preferably incorporated in the alumina by coprecipitation.

It is within the scope of this invention therefore to provide a process for the conversion of hydrocarbons and a catalyst therefore which comprises an active alumina containing small amounts of silica and compound of an active metal, and preferably also a compound of beryllium.

Modifications of this invention which would occur to one skilled in the art are to be considered within the scope of the invention as defined in the following claims:

We claim:
1. A process for the catalytic dehydrogenation of hydrocarbons which comprises subjecting said hydrocarbons to an elevated temperature in the presence of a catalyst comprising an activated alumina containing about 0.5% to about 15% of an oxide of an element selected from a class consisting of silicon, titanium, and zirconium, about 1% to about 15% of beryllia and a minor proportion of an oxide of a metal of group VI B.

2. A process according to claim 1 in which the metal of group VI B is chromium.

3. A process for the catalytic dehydrogenation of hydrocarbons which comprises subjecting said hydrocarbons to an elevated temperature in the presence of a catalyst comprising an activated alumina containing about 0.5% to about 15% of silica, about 1% to about 15% of beryllia and a minor proportion of an oxide of a metal of group VI B.

4. A process according to claim 3 in which the metal of group VI B is chromium.

5. A process for the dehydrogenation of normally gaseous hydrocarbons which comprises subjecting said hydrocarbons to an elevated temperature in the presence of a catalyst comprising an active alumina containing about 1% of silica, about 1% to about 15% of beryllia, and a minor proportion of chromia.

6. A process for the production of butadiene which comprises subjecting butenes to a temperature between about 550° C. and 650° C. in the presence of a catalyst consisting of about 1% silica, 5% beryllia, 5% chromia and 89% active alumina, said catalyst being prepared by a process involving precipitating a hydrous oxide gel of alumina and silica, drying and igniting said gel, impregnating it with compounds of beryllium and chromium and drying and igniting the product.

7. A process according to claim 1 in which the catalyst also contains an oxide of a different polyvalent metal selected from the class consisting of cobalt and nickel, in an amount approximately equimolal to the group VI B metal oxide.

8. A process for the catalytic dehydrogenation of normally liquid non-aromatic hydrocarbons which comprises subjecting said hydrocarbons to an elevated temperature in the presence of hydrogen and a catalyst comprising an activated alumina containing about 0.5% to about 15% of an oxide of an element selected from the class consisting of silicon, titanium and zirconium, about 1% to 15% of beryllia, and a minor proportion of an oxide of a metal of group VI B.

9. A process for the catalytic dehydrogenation of normally liquid non-aromatic hydrocarbons which comprises subjecting said hydrocarbons to an elevated temperature in the presence of hydrogen and a catalyst comprising an active alumina containing about 0.5% to about 15% of silica, about 1% to about 15% of beryllia, and a minor proportion of an oxide of a metal of group VI B.

10. A process for the catalytic dehydrogenation of hydrocarbons which comprises subjecting said hydrocarbons to an elevated temperature in the presence of a catalyst comprising an activated alumina containing about 0.5% to about 15% of an oxide of an element selected from the class consisting of silicon, titanium and zirconium, about 1% to 15% of beryllia and a minor proportion of molybdena.

11. A process according to claim 10 in which the catalyst also contains cobalt oxide in an amount approximately equimolal to the molybdena.

ROBERT L. PARKER, Jr.
HAL C. HUFFMAN.

REFERENCES CITED

The following references are of record in the file of this patent:

UNITED STATES PATENTS

| Number | Name | Date |
|---|---|---|
| 2,325,398 | Hearne et al. | July 27, 1943 |
| 2,330,804 | Atkinson | Oct. 5, 1943 |
| 2,325,911 | Huffman | Aug. 3, 1943 |
| 2,209,908 | Weiss | July 30, 1940 |
| 1,782,857 | Miller et al. | Nov. 25, 1930 |
| 2,184,234 | Groll et al. (A) | Dec. 19, 1939 |
| 2,184,235 | Groll et al. (B) | Dec. 19, 1939 |
| 2,172,535 | Grosse et al. | Sept. 12, 1939 |
| 2,354,892 | Thacker | Aug. 1, 1944 |
| 2,346,657 | Bloch et al. | Apr. 18, 1944 |
| 2,370,798 | Kearby | Mar. 6, 1945 |
| 2,371,087 | Webb et al. | Mar. 6, 1945 |

OTHER REFERENCES

Thorpe, "Dictionary of Applied Chemistry," (vol. 1) (1921). (Copy in Division 31.)